United States Patent
Duwenhorst

(10) Patent No.: US 9,582,905 B2
(45) Date of Patent: Feb. 28, 2017

(54) ADVERBIAL EXPRESSION BASED COLOR IMAGE OPERATIONS

(71) Applicant: Adobe Systems Incorporated, San Jose, CA (US)

(72) Inventor: Sven Duwenhorst, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 199 days.

(21) Appl. No.: 14/107,747

(22) Filed: Dec. 16, 2013

(65) Prior Publication Data

US 2015/0170380 A1   Jun. 18, 2015

(51) Int. Cl.
*G06T 11/00* (2006.01)
*G06F 17/30* (2006.01)

(52) U.S. Cl.
CPC ........ *G06T 11/001* (2013.01); *G06F 17/3025* (2013.01); *G06T 2200/24* (2013.01)

(58) Field of Classification Search
None
See application file for complete search history.

(56) References Cited

U.S. PATENT DOCUMENTS

| 2013/0050238 A1* | 2/2013 | Bergou | H04N 1/62 345/589 |
| 2013/0207994 A1* | 8/2013 | Rodeski | G06F 17/30899 345/594 |

OTHER PUBLICATIONS

Evad "Idee Labs: Multicolor Image Search", posted online @http://www.colourlovers.com/web/blog/2008/07/23/idee-labs-multicolr-search-lab since Jul. 23, 2008.*
Bumgardner "Experimental Colr Pickr-" posted online @http://web.archive.org/web/20121028185537/http://krazydad.com/colrpickr/ since Oct. 28, 2012.*
Sindol Different ways to create Custom Colors for Charts in SQL Server Reporting Services downloaded @ http://web.archive.org/web/20121103234219/http://www.mssqltips.com/sqlservertip/2797/different-ways-to-create-custom-colors-for-charts-in-sql-server-reporting-services/, dated on Nov. 3, 2012.*
Pie Chart, "Pie Chart" downloaded @ http://web.archive.org/web/20121029022701/http://www.r-tutor.com/elementary-statistics/qualitative-data/pie-chart, dated on Oct. 29, 2012.*
"Locality-Sensitive Hashing", Wikipedia, retrieved from <http://en.wikipedia.org/wiki/Locality_sensitive_hashing> on Nov. 13, 2013, Oct. 18, 2013, 5 pages.

* cited by examiner

Primary Examiner — YingChun He
(74) Attorney, Agent, or Firm — Wolfe-SBMC

(57) ABSTRACT

A color palette for an image is obtained, which is a set of different colors that are determined to be the dominant colors in the image. The color palette can be displayed to a user, and a user input in the form of an adverbial expression to change the color palette is received. The adverbial expression can indicate various different changes to the color palette, such as more or less of a particular color, making a color brighter or darker, making all colors in the color palette shallower or deeper, increasing or reducing the contrast of colors in the color palette, and so forth. The adverbial expression can be transformed into a new color palette and a color based image search can be initiated to identify images based on the colors in the new color palette, or an image can be modified based on the adverbial expression.

20 Claims, 10 Drawing Sheets

500

600

1000

| |
|---|
| Black |
| Blue |
| Blue-magenta |
| Cyan |
| Cyan-blue |
| Gray |
| Green |
| Green-cyan |
| Magenta |
| Magenta-pink |
| Orange-brown |
| Orange-yellow |
| Pink |
| Red |
| Red-orange |
| White |
| Yellow |
| Yellow-green |

Fig. 10

ADVERBIAL EXPRESSION BASED COLOR IMAGE OPERATIONS

BACKGROUND

Users commonly have access to many different digital images, including digital images that users have taken or created themselves as well as digital images taken or created by others. Situations can arise where users want to perform operations on images, but it can be difficult for users to perform such operations. For example, if a user wants to find digital images with certain color characteristics, given the large number of digital images available to the user it can be difficult for the user to locate the images that have the desired color characteristics. Such difficulties can increase user frustration and reduce the user friendliness of services that make images available to users.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a user input in the form of an adverbial expression indicating a change to a color palette of an image is received. The user input is transformed into a new color palette, and an image search is initiated using search criteria based on the new color palette.

In accordance with one or more aspects, a user input in the form of an adverbial expression indicating a change to a color palette of an image is received. The image is modified based on the adverbial expression, and the modified image is displayed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 10 illustrates example color groupings in accordance with one or more embodiments.

DETAILED DESCRIPTION

Adverbial expression based color image operations are discussed herein. A color palette for an image is obtained, the color palette of an image being a set of different colors that are determined to be the dominant colors in the image. The color palette is optionally displayed to a user, and a user input in the form of an adverbial expression to change the color palette is received. An adverbial expression refers to a user input indicating an increase or decrease in a color characteristic of one or more images relative to a current setting or value for the color characteristic, the user input indicating simply more or less of a color characteristic rather than numerical values for a color characteristic. The adverbial expression can indicate various different changes to the color palette, such as more or less of a particular color, making a color brighter or darker, making all colors in the color palette shallower or deeper, increasing or reducing the contrast of colors in the color palette, and so forth.

The adverbial expression is transformed into a new color palette that can be used as the basis for a search query. A color based image search can be initiated based on the new color palette, the search identifying images based on the colors in the images and the colors in the new color palette. Thus, the user is able to use adverbial expressions to search for images, such as requesting more or less of a particular color, increasing or reducing the contrast of colors, and so forth. For example, in response to displaying an image, a user input indicating that pictures that have more blue or have more contrast can be received. The user input can be provided in various manners, such as the user verbally stating "more blue" or "more contrast", the user selecting a displayed up or down arrow, and so forth. Thus, the user is able to provide various different user inputs to create a new search criteria, the user inputs being more intuitive for the user than techniques that would require a user to input a specific number or value specifying the search criteria.

Additionally or alternatively, the new color palette can be used as a basis for image manipulation. Changes can be made to an image based on the adverbial expression. Thus, the user is able to use adverbial expressions to change images, such as changing the image to have more or less of a particular color, increasing or reducing the contrast of colors, and so forth.

Figure 1:
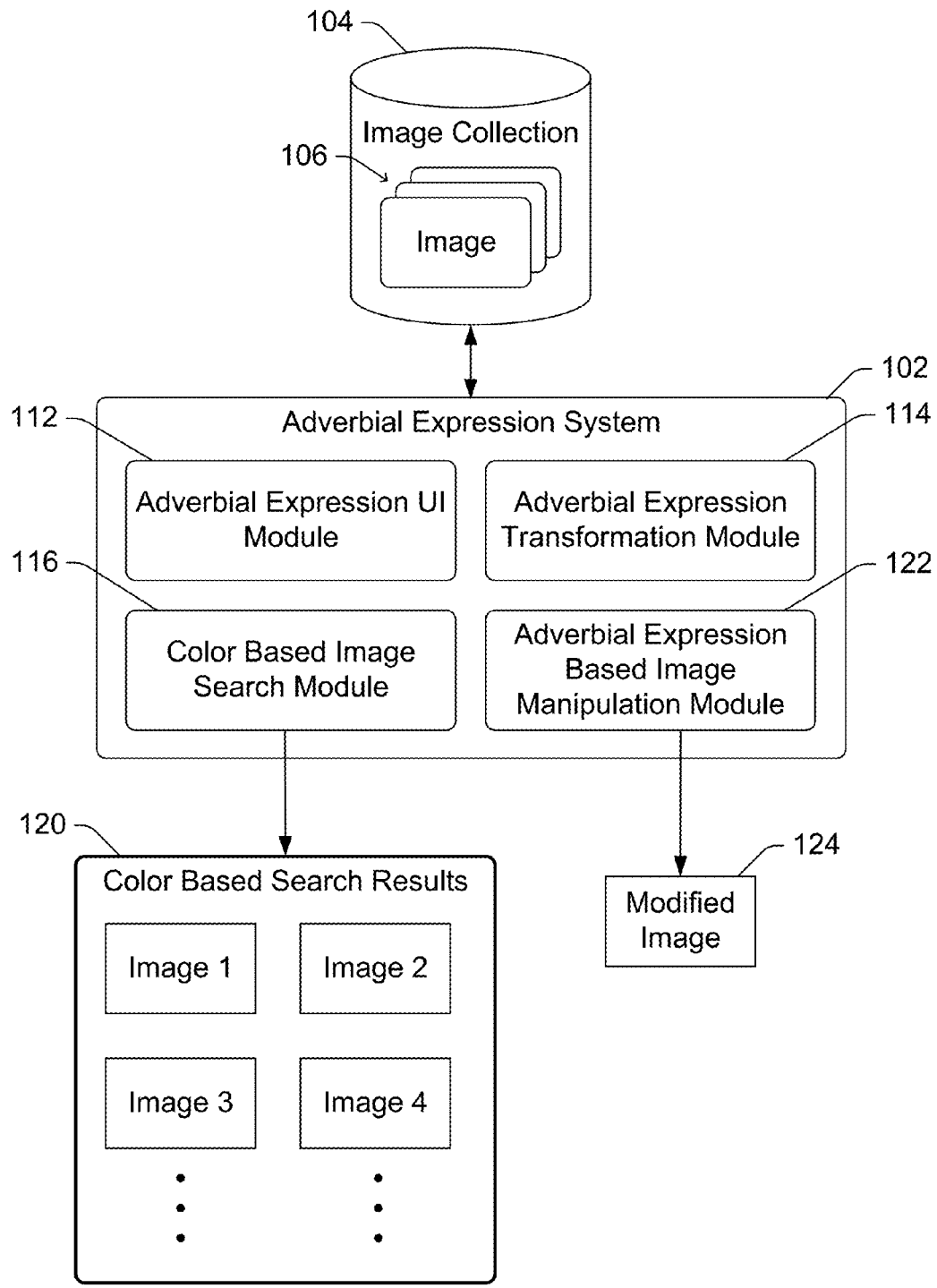
FIG. 1 illustrates an example environment in which the adverbial expression based color image operations can be used in accordance with one or more embodiments.

FIG. 1 illustrates an example environment 100 in which the adverbial expression based color image operations can be used in accordance with one or more embodiments. Environment 100 includes an adverbial expression system 102 and an image collection 104. Adverbial expression system 102 supports various different operations on color images, such as searching color images and/or modifying color images as discussed in more detail below. Image collection 104 includes multiple images 106 that can be stored at a variety of different sources. For example, images 106 can be stored in a publicly accessible database, in a private storage service, on a computing device or other image capture device of a user, and so forth.

Adverbial expression system 102 includes an adverbial expression user interface (UI) module 112 and an adverbial expression transformation module 114. An adverbial expression refers to a user input indicating an increase or decrease in a color characteristic of one or more images relative to a current setting or value for the color characteristic. The adverbial expression is an input indicating simply more or less of a color characteristic, and is input in the absence of inputting (and typically in the absence of displaying) numerical values for color characteristics—no numerical values for particular color characteristics are input by the user, no numerical values for current color characteristics need be displayed (and typically none are displayed) to the user and no numerical values for new color characteristics resulting from the user input need be displayed (and typically none are displayed) to the user. The color characteristic can be an amount of one or more colors, brightnesses of one or more colors, contrasts of one or more colors, and so forth. For example, using adverbial expressions a user can simply indicate that he or she desires more or less of a particular color. The user need not be concerned with a particular numerical value representing the particular color, or how to change any settings or values to represent more of the particular color. Rather, the user is provided with a more intuitive UI that allows the user to simply indicate he or she desires more or less of a particular color.

Various other adverbial expressions can also be input, such as an indication that he or she desires more of a particular color and less of another color (or less of all other colors). The adverbial expression can also include an indication of an amount of the more or less that is desired by the user, such as providing an input of "a little more green", "more green", and "most green". These indications of amount are used in determining an amount of change to make to a color palette as discussed in more detail below.

The adverbial expression UI module 112 presents a UI that receives user inputs that are adverbial expressions. The user inputs can be received in a variety of different manners, such as touch inputs to a touch screen or touch pad, inputs from a cursor control device or keypad, verbal inputs, and so forth. The adverbial expression UI module 112 includes various components or modules based on the inputs supported, such as touch screen functionality, a microphone and speech recognition engine, and so forth.

The UI presented by module 112 also displays a color palette of an image, allowing the adverbial expressions to be made with reference to the color palette. The color palette of an image refers to a set of different colors that are determined to be the dominant colors in the image. Each pixel of an image can have a different color, and the number of different colors that a pixel may have can vary (e.g., ranging from a couple colors to millions or billions of colors). The set of colors that are dominant in the image can be determined using any of a variety of public and/or proprietary techniques, such as any of a variety of clustering algorithms. For example, the colors of the pixels in the image can be identified and a clustering algorithm used to identify groups of pixels that are close to one another (e.g., within a threshold distance of one another). The largest groups (e.g., the groups having the largest numbers of pixels) can be selected, and for each of the largest groups a color representative of the group (e.g., an average of the colors of the pixels in the group) can be identified as a dominant color in the image.

The number of different dominant colors that are identified can vary. In one or more embodiments, four or five dominant colors in the image are identified and used as the color palette for the image. Alternatively, the color palette for the image can include different numbers of dominant colors. Adverbial expressions can be input by a user with reference to the color palette of an image in a variety of different manners as discussed in more detail below.

The adverbial expression transformation module 114 generates a search query by transforming the adverbial expression received from a user into a search query. The transformation can include generating a new color palette that is the color palette of an image changed in response to the received adverbial expression. The colors in the new color palette are used as a basis for generating search criteria of the search query.

Adverbial expression system 102 also includes a color based image search module 116. The search query generated by the transformation module 114 is made available to the search module 116. The search module 116 searches images 106 to identify images that satisfy the search query. The one or more images identified by image search module 116 are provided as color based search results 120. The search results 120 can be provided by system 102 in a variety of different manners, such as displayed or otherwise presented to a user of system 102, communicated to another device or system, stored in a data store for subsequent retrieval, and so forth.

Adverbial expression system 102 also includes an adverbial expression based image manipulation module 122. The image manipulation module 122 transforms the adverbial expression received from a user into changes to an image and makes those changes to the image, resulting in modified image 124. The image to which the changes are applied can be identified in various manners, such as one of the images 106 that is selected by a user of the adverbial expression system 102.

It should be noted that system 102 and/or image collection 104 can be implemented on the same device or multiple devices. For example, adverbial expression system 102 can be implemented on one device (e.g., a server computer or a user's laptop computer) and image collection 104 can be implemented on one or more other devices. By way of another example, system 102 and/or image collection 104 can each be implemented by multiple different devices. By way of yet another example, system 102 and image collection 104 can be implemented on a single device.

It should also be noted that the adverbial expression system 102 need not include all of the modules illustrated in FIG. 1. For example, if the adverbial expression system 102 performs image searching but not image manipulation, then the adverbial expression system 102 need not include the adverbial expression based image manipulation module 122. By way of another example, if the adverbial expression system 102 performs image manipulation but not image searching, then the adverbial expression system 102 need not include the color based image search module 116.

Figure 2:
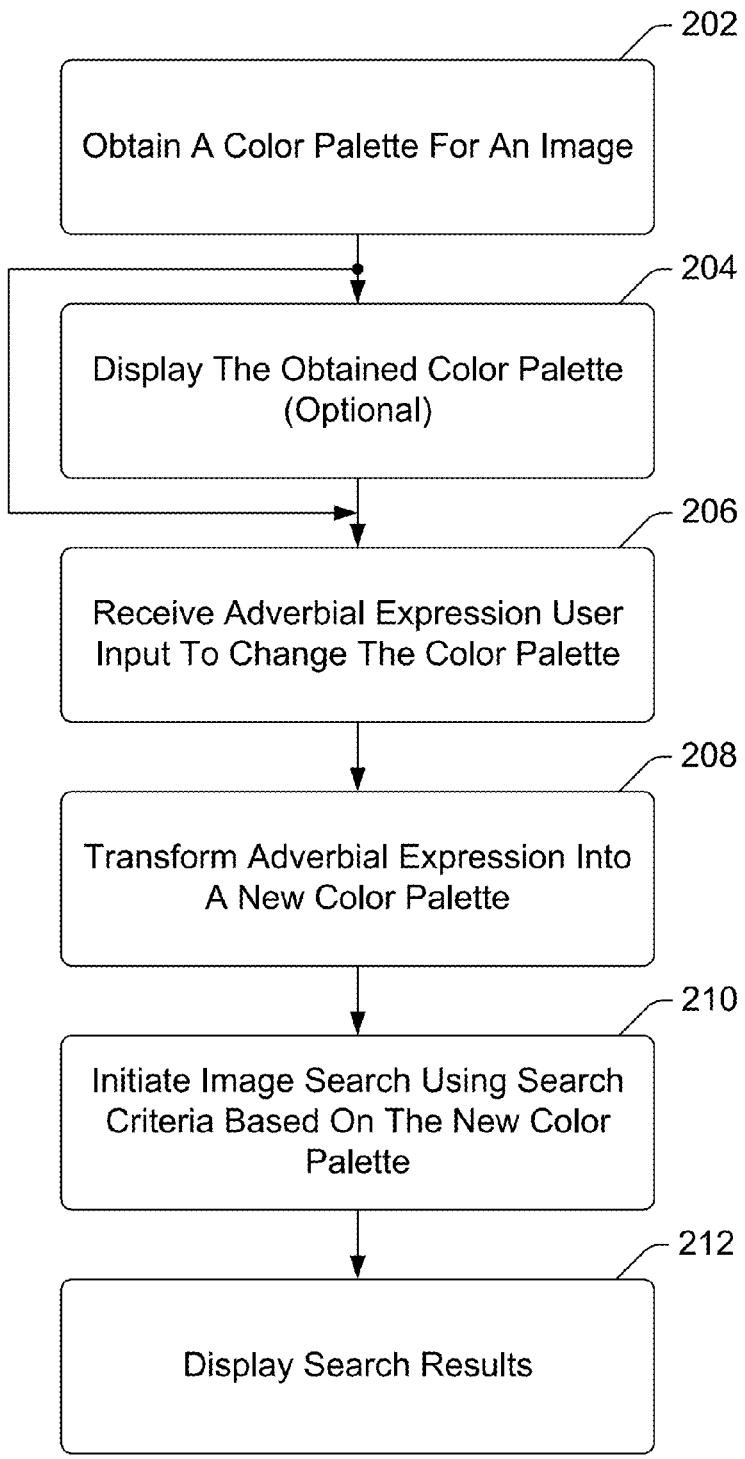
FIG. 2 is a flowchart illustrating an example process for implementing adverbial expression based color image operations in accordance with one or more embodiments.

FIG. 2 is a flowchart illustrating an example process 200 for implementing adverbial expression based color image operations in accordance with one or more embodiments. In process 200, the operation is searching color images. Process 200 is carried out by a system, such as adverbial expression system 102 of FIG. 1, and can be implemented in software, firmware, hardware, or combinations thereof. Process 200 is shown as a set of acts and is not limited to the order shown for performing the operations of the various acts. Process 200 is an example process for implementing adverbial expression based color image operations; additional discussions of implementing adverbial expression based color image operations are included herein with reference to different figures.

In process 200, a color palette for an image is obtained (act 202). The image can be any of a variety of different images, such as an image returned in response to a previous image search, an image selected or otherwise provided by a user, an image selected or otherwise identified based on other rules or criteria, and so forth. The color palette can be obtained in any of a variety of different manners, such as being extracted from the image in act 202 using any of a variety of public and/or proprietary techniques. Alternatively, the color palette for the image can have been previously generated and associated with the image, and can be obtained along with obtaining the image.

The obtained color palette is optionally displayed (act 204). The color palette is displayed by displaying the colors of the color palette. Numbers or other values representing the colors of the color palette need not be and typically are not displayed along with displaying the colors (although could alternatively be displayed if desired). Although discussed as being displayed, it should be noted that the color palette can alternatively be presented to the user in other manners, such as a description being played back audibly. Additionally, in some situations the color palette is not displayed. Rather, the adverbial expression can be provided by the user (e.g., a verbal or text input for more of a particular color) in the absence of the color palette being displayed.

Figure 3:
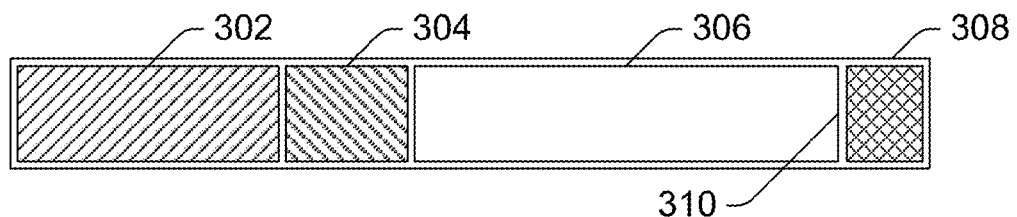
FIGS. 3, 4, 5, 6, 7, and 8 illustrate example color palettes in accordance with one or more embodiments.

FIG. 3 illustrates an example color palette 300 for an image. The color palette 300 is a set of four different colors that are dominant in the image. Each of the four different colors in the color palette 300 is illustrated with different patterns in FIG. 3. The colors in the color palette 300 include a color 302, a color 304, a color 306, and a color 308. As can be seen in FIG. 3, the colors in the color palette 300 are displayed to the user, rather than numbers or other values representing the colors.

For each color in the color palette 300, the size or amount of the color indicates how much of the color (or other colors within a threshold distance of the color in a color space) is included in the image. The size or amount of the color can be, for example, a percentage of the image that includes that color and similar colors (e.g., colors that are assigned to the same group or cluster when the dominant colors in the image are determined). For example, in the color palette 300, the size of color 306 is larger than the size of color 308, indicating that the image includes more pixels with the color 306 (or similar colors) than the color 308.

Returning to FIG. 2, a user input in the form of an adverbial expression to change the color palette is received (act 206). The adverbial expression indicates an increase or decrease in a color characteristic of the image based on the obtained color palette, and can refer to various different color characteristics as discussed in more detail below. An adverbial expression can be provided in a variety of different manners.

In one or more embodiments, the adverbial expression is made by a user input manipulating a displayed color palette. The displayed color palette can be manipulated in various manners, such as dragging an edge of a color in the displayed color palette. For example, referring to the color palette 300 of FIG. 3, the left edge 310 of the color 306 can be dragged to the left to indicate less of the color 306, and can be dragged to the right to indicate more of the color 306. The dragging can be done in various manners, such as by the user touching the left edge 310 with his or her finger and dragging the left edge 310 to the left or right, by the user clicking on the left edge 310 with a mouse and cursor and dragging the left edge 310 to the left or right, and so forth.

Figure 4:
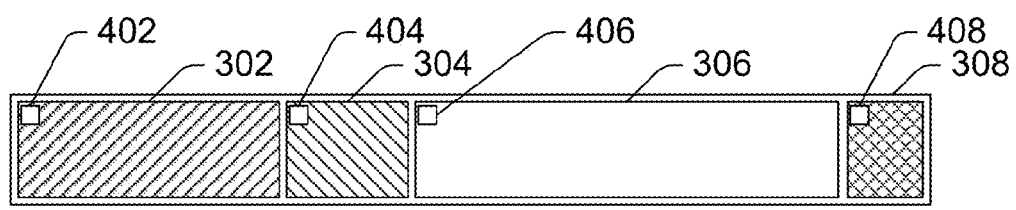

The dragging can also be done by selecting and dragging boxes or icons illustrated within the colors. For example, each color in the color palette 300 can have an associated selection box, and those selection boxes can be dragged to the left to indicate more of a color and dragged to the right to indicate less of a color. FIG. 4 illustrates an example color palette 400 for an image, the colors in the color palette 400 including the color 302, the color 304, the color 306, and the color 308 as in FIG. 3. However, in FIG. 4 each of the colors 302, 304, 306, and 308 has an associated selection box 402, 404, 406, and 408 that is displayed within the colors 302, 304, 306, and 308. A selection box 402, 404, 406, or 408 can be selected and dragged to the left or right to indicate more or less of the associated color. For example, the selection box 404 can be selected (e.g., by a user touching the selection box 404 with a finger or other object, by a user clicking on the selection box 404 with a mouse and cursor, and so forth) and dragged to the left to indicate more of the color 304 and dragged to the right to indicate less of the color 304.

Various other user inputs can also be used to manipulate the displayed color palette. For example, a user input can be a gesture on a color in the color palette or within a threshold distance of the color palette (e.g., a gesture in which two fingers or other objects are moved towards one another to indicate less of a color and moved away from one another to indicate more of a color, a gesture in which one or more colors of the color palette are touched indicating that the width of the touched colors is to remain the same but the width of each of the non-touched colors is to be increased and/or decreased).

Alternatively, the adverbial expressions can be made by user inputs to a menu, list, or other display of possible adverbial expressions, including mouse wheel inputs, mouse over or head-up display (HUD) inputs, and so forth. For example, menu options of "more" and/or "less" can be displayed for each color in the color palette, and the user can select the "more" menu option to indicate more of a particular color and the "less" menu option to indicate less of a particular color. By way of another example, up and/or down arrows can be displayed for each color in the color palette, and the user can select the up arrow to indicate more of a particular color and the down arrow to indicate less of a particular color. By way of yet another example, a "+" icon and/or a "−" icon can be displayed for each color in the color palette, and the user can select the "+" icon to indicate more of a particular color and the "−" icon to indicate less of a particular color.

Alternatively, the adverbial expressions can be made by various other types of user inputs. For example, audible inputs such as "more gray" or "less green" can be input. Which color in the color palette corresponds to an audible input can be identified in different manners, such as by an adverbial expression UI module displaying labels corresponding to the different colors in the color palette so that the user can identify a particular color by stating the label corresponding to the color, by the adverbial expression UI module using various algorithms, rules, or criteria to automatically identifying which color in the color palette is represented by the audible input without displaying labels for the colors, and so forth.

The color palette is changed in response to the adverbial expression, and the resultant color palette is optionally displayed. The manner in which the color palette changes depends on the particular adverbial expression. For example, if an adverbial expression indicates more of a particular color, then the color palette is changed to include more of that particular color and less of at least one other color. By way of another example, if an adverbial expression indicates less of a particular color, then the color palette is changed to include less of that particular color and more of at least one other color.

Figure 5:
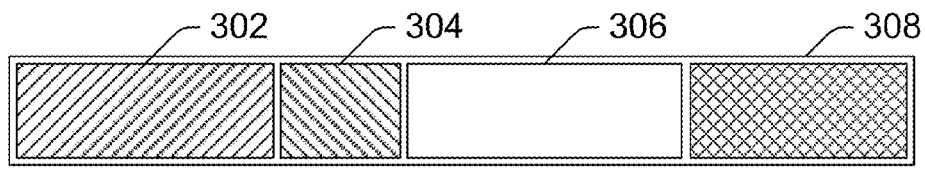

FIG. 5 illustrates an example color palette 500, the colors in the color palette 500 including the color 302, the color 304, the color 306, and the color 308 as in FIG. 3. However, in FIG. 5, an adverbial expression for less of the color 306 has been received, and in response the amount of color 306 in color palette 500 has been decreased so that the color palette 500 includes less of the color 306 than the color palette 300 of FIG. 3. In the example of FIG. 5, the amount of the color 306 has been decreased, and the amount of the adjacent color 308 has been increased (by the same amount that the color 306 was decreased).

Figure 6:
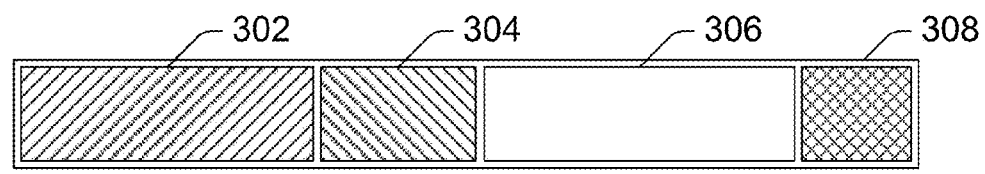

FIG. 6 illustrates an example color palette 600, the colors in the color palette 600 including the color 302, the color 304, the color 306, and the color 308 as in FIG. 3. However, in FIG. 6, an adverbial expression for less of the color 306 has been received, and in response the amount of color 306 in color palette has been decreased so that the color palette 600 includes less of the color 306 than the color palette 300 of FIG. 3. In the example of FIG. 6, the amount of the color 306 has been decreased, and the amount of the other colors 302, 304, and 308 have been increased (the total of the amount of the increase of the colors 302, 304 and 308 is the same amount as the color 306 was decreased).

In the examples of FIGS. 3-6, the color palettes are illustrated as being rectangular in shape and the different colors are displayed adjacent to one another horizontally. It should be noted that these illustrations are examples, and that the color palettes can be displayed in other manners. For example, the color palettes can be rectangular in shape but with the different colors displayed adjacent to one another vertically. By way of another example, the color palettes can be displayed using other geometric shapes, such as circles (e.g., with concentric rings of different colors about the center of the circle or different slices (e.g., analogous to pie slices) of the circle being different colors), triangles (e.g., with different portions of the triangle identifying different colors), and so forth. These different shapes or portions of shapes can be manipulated by a user in different manners to provide the adverbial expression.

Figure 7:
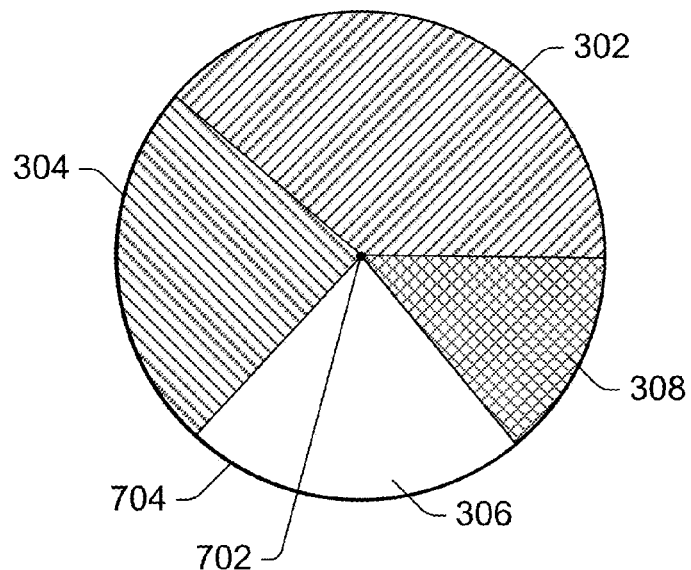

FIG. 7 illustrates an example color palette 700 for an image, the colors in the color palette 700 including the color 302, the color 304, the color 306, and the color 308 as in FIG. 3. However, in FIG. 7 the color palette 700 is displayed as a circle with different slices of the circle being different colors. The color palette 700 can be manipulated in various manners to provide the adverbial expression user input. For example, the width of a slice of a circle can be increased or decreased to change a color characteristic of the color palette, such as the amount of the color in the color palette. By way of another example, the length of a slice (e.g., from the center 702 to the edge 704 of the circle) can be increased to indicate more of a color characteristic (e.g., make the color brighter) and decreased to become indicate less of a color characteristic (e.g., make the color darker). Following this example, the color palette 700 continues to be displayed as multiple slices, but is no longer a circle because the lengths of slices has changed.

Figure 8:
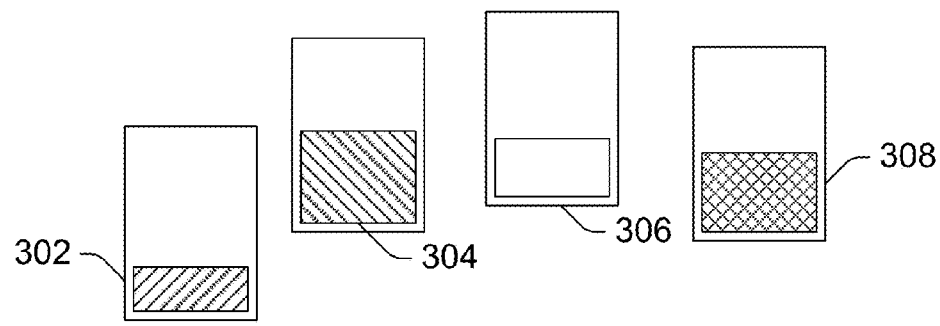

The color palette can also be displayed in different manners to facilitate user input of adverbial expressions, and in one or more embodiments the color palette is displayed in a different manner in response to a user input (e.g., a user touching a particular portion of a touchscreen) indicating the user intends to input an adverbial expression. FIG. 8 illustrates an example color palette 800 for an image, the colors in the color palette 800 including the color 302, the color 304, the color 306, and the color 308 as in FIG. 3. The colors 302, 304, 306, and 308 can have a particular size or display area indicating an amount of the color in the color palette (similar to color palette 300 of FIG. 3). However, in FIG. 8 the color palette 800 is displayed as having been fanned out, providing additional spacing between the displayed colors. A user could, for example, touch each of the colors 302, 304, 306, and 308 with a different finger, and an adverbial expression user input for a particular color by moving the finger touching the particular color of the color palette 800 in a particular manner (e.g., one direction, motion, or gesture for more or less of one color characteristic, another direction, motion, or gesture for more or less of another color characteristic, and so forth).

Returning to FIG. 2, the received adverbial expression to change the color palette is transformed into a new color palette that is used as the basis for a search query (act 208). The received adverbial expression can be transformed into a new color palette in a variety of different manners. The adverbial expression can refer to various different color characteristics of the image, and the transformation of the received adverbial expression into a search query is based at least in part on the color characteristic that is referred to.

In one or more embodiments, the color characteristics of an image include an amount of a subset of colors in the image, and the adverbial expression includes an indication to have more or less of the subset of colors. The subset of colors can be a single color in the displayed color palette, or alternatively two or more (but less than all) of the colors in the displayed color palette. The user input indicates which colors are included in the subset of colors.

The amount of a particular color is increased or decreased by changing an amount of the color in the color palette. The amount of each color in the color palette can be maintained and identified by the adverbial expression system in a variety of different manners. In one or more embodiments, the color palette includes a set of numbers or other values that identify how much of each color is included in the color palette (e.g., a set of percentages that total to 100%). This set of numbers or other values is maintained as part of or associated with the color palette, but need not be (and typically is not) displayed to the user. The number or value of a particular color can be increased if the amount of the color is to be increased, and the number or value of a particular color can be decreased if the amount of the color is to be decreased.

The amount of the increase or decrease in the number or value of a particular color is dependent on the user input. The amount the number or value of a particular color is increased is greater in response to user inputs requesting greater amounts of the particular color than user inputs requesting lesser amounts of the particular color. For example, if the user input reduces the amount of a particular color in the displayed color palette by 25%, then the amount the number or value of that particular color is decreased is 25% (or within a threshold amount of 25%). By way of another example, if the user input is an indication of "a little more green" then the amount of the green color in the displayed color palette is increased by 25%, if the user input is an indication of "more green" then the amount of the green color in the displayed color palette is increased by 50%, and if the user input is an indication of "most green" then the amount of the green color in the displayed color palette is increased by 100%.

In one or more embodiments, the color characteristics of an image include the brightness of a subset of colors in the image, and the adverbial expression includes an indication to increase or decrease the brightness of the subset of colors. Increasing or decreasing the brightness of a color can also be referred to as having more or less brightness of the color. The subset of colors can be a single color in the displayed color palette, or alternatively two or more (but less than all) of the colors in the displayed color palette. The user input indicates which colors are included in the subset of colors.

The colors in an image or color palette can be represented using a variety of different color spaces. Examples of such color spaces include the RGB (red, green, blue) color space, the HSV (hue, saturation, value) color space, the YUV (luma and chrominance) color space, the Lab color space, and so forth. The Lab color space includes a value "L" for lightness and values "a" and "b" for color components. The representation of a color can be converted from one color space to another color space using any of a variety of public and/or proprietary techniques.

The brightness of a color can be increased or decreased in a variety of different manners. In one or more embodiments, the brightness of a color is increased or decreased by increasing or decreasing the L value in the Lab color space for the color. The amount of the increase or decrease in the brightness of a particular color is dependent on the user input. The amount the brightness of a particular color is increased or decreased is greater in response to user inputs requesting greater changes in brightness for the particular color than user inputs requesting lesser changes in brightness for the particular color. If the color in the color palette to be increased or decreased is not already in the Lab color space, then the color is converted to the Lab color space, the L value of the color is increased or decreased, and then the color can be converted back to its previous color space.

In one or more embodiments, the color characteristics of an image include the depth of colors in the image, and the adverbial expression includes an indication to make the depth of the colors shallower or deeper. Making a color shallower can also be referred to as having less depth of the color, and making the color deeper can also be referred to as having more depth of the color. User inputs to increase the depth of a particular color (a color in the color palette or alternatively another color that is not in the color palette) can be received, such as to make the colors in the color palette a deeper green, a shallower red, and so forth. In response to such user inputs, the depth of that particular color in the colors of the color palette is made shallower or deeper.

Figure 9:
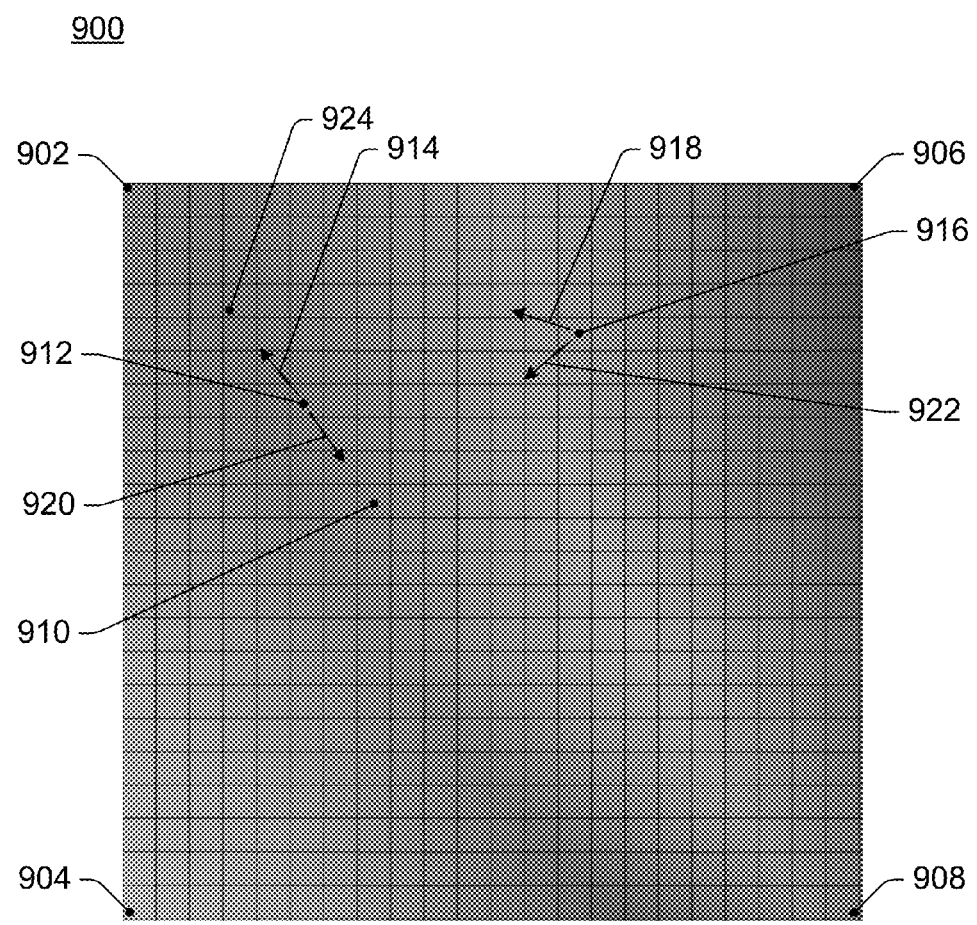
FIG. 9 illustrates an example color chart in accordance with one or more embodiments.

In response to a request for a shallower or deeper color, the depth of each of the colors in the color palette is increased or decreased. The depth of a color can be increased or decreased in a variety of different manners. In one or more embodiments, the depth of a color in the color palette is increased or decreased based on a color chart. FIG. 9 illustrates an example color chart 900 in accordance with one or more embodiments. The color chart 900 illustrates a color chart for the Lab color space, although color charts for other color spaces can alternatively be used. The color chart 900 is a greyscale version of a color chart for the Lab color space, with a location 902 representing light green, a location 904 representing light blue, a location 906 representing light red, a location 908 representing light magenta, and a location 910 representing dark green. The locations of particular colors (e.g., light blue, dark blue, light red, dark red, etc.) can be determined in different manners, such as being pre-configured in the adverbial expression system (e.g., system 102 of FIG. 1), being obtained from another device or system, and so forth. It should be noted that although the example color chart 900 is a two-dimensional color chart, color charts with three or more dimensions can alternatively be used.

For a given color, the depth of that color is decreased (the color is made shallower) by moving that color towards a target location of the color chart that represents the light version of the color to be made shallower. For example, if the user input is to make the colors a shallower green, then each color in the color palette is moved towards the location 902, which represents light green. Thus, if one color in the color palette were a shade of green represented by location 912, then to be made shallower green that color would be moved towards the location 902 as illustrated by arrow 914. Furthermore, if one color in the color palette were a shade of orange represented by location 916, then to be made shallower green that color would be moved towards the location 902 as illustrated by arrow 918.

Similarly, for a given color, the depth of that color is increased (the color is made deeper) by moving that color towards a target location of the color chart that represents the dark version of the color to be made deeper. For example, if the user input is to make the colors a deeper green, then each color in the color palette is moved towards the location 910, which represents dark green. Thus, if one color in the color palette were a shade of green represented by the location 912, then to be made deeper green that color would be moved towards the location 910 as illustrated by arrow 920. Furthermore, if one color in the color palette were a shade of orange represented by the location 916, then to be made deeper green that color would be moved towards the location 910 as illustrated by arrow 922.

Moving a color towards a particular location of a color chart refers to changing the color to be a color that is closer to the location of the color chart. For example, moving the color represented at location 912 towards the location 902 can result in the color being changed to be the color represented at location 924.

The amount of the movement of a particular color is dependent on the user input. The amount that the depth of a particular color is increased or decreased is greater in response to user inputs requesting greater changes in depth for the particular color than user inputs requesting lesser changes in depth for the particular color. The amount of movement can be a fixed amount (e.g., a particular distance based on the user input) or a relative amount (e.g., a percentage of the distance between the current location and the target location, the percentage being dependent on the user input). For example, if the user input were to be a request to make the colors a much deeper green then the movement may be 30% of the distance between the current location and the location 910, whereas if the user input were to be a request to make the colors a slightly deeper green then the movement may be 5% of the distance between the current location and the location 910.

In one or more embodiments, the adverbial expression transformation module uses color groupings or buckets to assign colors to one of multiple different groups. FIG. 10 illustrates example color groupings 1000 in accordance with one or more embodiments. Colors can be assigned in a variety of different manners, such as based on the desires of a developer or user of the adverbial expression system. The example color groupings 1000 include 18 groups with a particular ordering as follows: black, blue, blue-magenta, cyan, cyan-blue, gray, green, green-cyan, magenta, magenta-pink, orange-brown, orange-yellow, pink, red, red-orange, white, yellow, yellow-green. However, it should be noted that alternatively larger or smaller numbers of groups may be used. Each possible color is assigned to one of the groupings (e.g., by a developer of the adverbial expression system, by another device or service, etc.), so each grouping includes multiple shades of the color associated with the grouping. For example, the yellow-green grouping includes multiple different shades of the yellow-green color. It should be noted that although the groupings 1000 are one-dimensional, groupings using two or more dimensions or other data structures (e.g., tree structures) can alternatively be used.

The movement of a particular color can be determined based at least in part on the color groupings. In one or more embodiments, a color can be moved to another color within the same grouping, but not to a different grouping. For example, in response to a user input requesting a deeper green color, a color in the green-cyan grouping can be changed to another color that is deeper green but still within the green-cyan grouping, but is not changed to a color in a different grouping. Alternatively, a color can be moved to another color in a different grouping, although the number of different groupings may be restricted. For example, using the ordering of the 18 groups in the example above, in response to a user input requesting a deeper green color, a color in the green-cyan grouping can be changed to another color that is deeper green but still within the green-cyan grouping or another color that is deeper green and in the green grouping. The movement may be restricted, for example to one grouping in accordance with the ordering in FIG. 10, so a color in the green-cyan grouping could be changed to another color that is in the green grouping or the magenta grouping, but not to a color in the gray grouping or the magenta-pink grouping.

In one or more embodiments, in response to a request for a shallower or deeper color, the depth of each of the colors in the color palette is increased or decreased. Alternatively, the depth of one or more (but less than all) of the colors in the color palette can be increased or decreased. Which colors of the color palette are to have their depths increased or decreased can be determined in different manners, such as by user selection of particular colors of the color palette. The depth of each of the one or more colors is increased or decreased as discussed above, although only the depth of the selected one or more colors is increased or decreased.

In one or more embodiments, the color characteristics of an image include the colorfulness of colors in the image, and the adverbial expression includes an indication to make the colors more or less colorful. The colors can be made more or less colorful in a variety of different manners.

In one or more embodiments, the colors are made or less colorful based on the distribution of colors in the color space. The colors are made less colorful by moving the colors towards grayscale colors, and are made more colorful by moving the colors away from grayscale colors. The amount of the increase or decrease in the colorfulness of the colors is dependent on the user input. The amount the colorfulness is increased or decreased is greater in response to user inputs requesting greater changes in colorfulness than user inputs requesting lesser changes in colorfulness.

Figure 11:
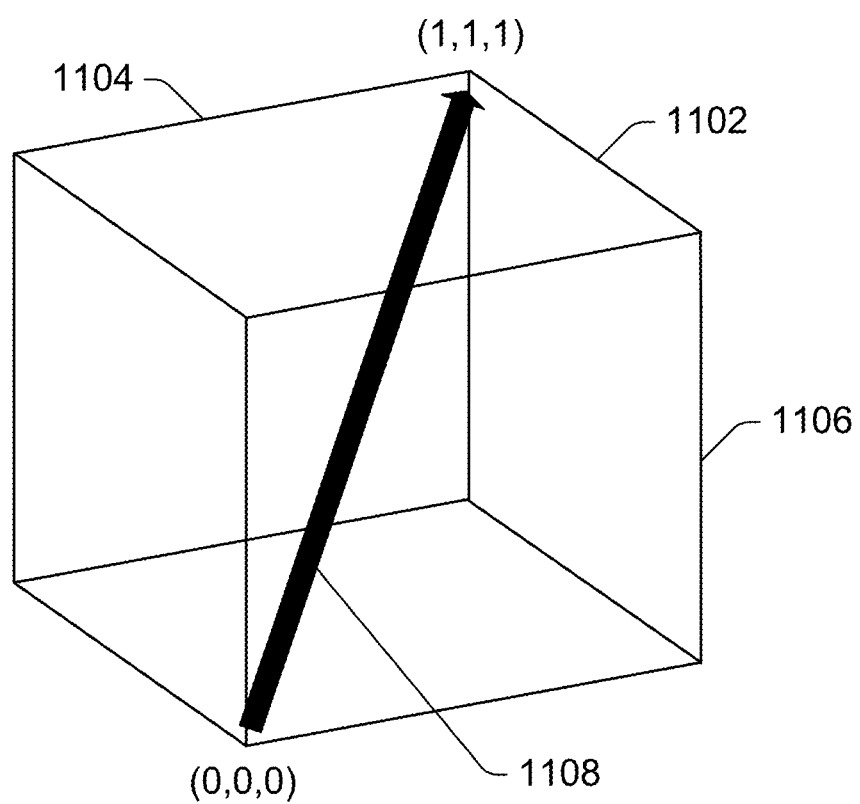
FIG. 11 illustrates an example distribution of colors throughout a color space in accordance with one or more embodiments.

FIG. 11 illustrates an example distribution of colors throughout a color space 1100 in accordance with one or more embodiments. The color space 1100 is the RGB color space and is illustrated as a cube, with a red element along an axis 1102, a green element along an axis 1104, and a blue element along an axis 1106. Each pixel in an image is represented by a location in color space 1100. Grayscale colors are colors along (or within a threshold distance of) a grayscale arrow 1108, extending from a location (0,0,0) to (1,1,1) in the color space 1100 (assuming the red element, green element, and blue element of a pixel is each represented by a value ranging between 0 and 1).

The color of a pixel is moved towards grayscale colors by changing the color to be closer to the grayscale arrow 1108. Similarly, the color of a pixel is moved away from grayscale colors by changing the color to be further from the grayscale arrow 1108 (e.g., moved in a direction perpendicular to the grayscale arrow 1108). Colors can be moved in various manners as discussed above.

A new color palette is obtained from the colors of the pixels in the image as changed to be closer to or further from the grayscale colors. The new color palette can be extracted from the changed colors of the pixels in the image using any of a variety of public and/or proprietary techniques (e.g., using a clustering algorithm as discussed above).

In one or more embodiments, the color characteristics of an image include the contrast of colors in the image, and the adverbial expression includes an indication to increase or decrease the contrast of the colors. Increasing or decreasing the contrast of colors can also be referred to as having more or less contrast for the colors. The contrast of the colors is increased by increasing the tonal values in the color palette, and the contrast of the colors is decreased by decreasing the tonal values in the color palette. The tonal values can be increased or decreased using any of a variety of public and/or proprietary techniques.

The amount of the increase or decrease in the contrast of the colors is dependent on the user input. The amount the contrast is increased or decreased is greater in response to user inputs requesting greater changes in contrast than user inputs requesting lesser changes in contrast.

Returning to act 208 of FIG. 2, the changing of the colors in the color palette results in a new color palette. A user input can be received changing a single color characteristic of the image and thus the new color palette in act 208 is based on a change to a single color characteristic of the image. Alternatively, a user input can be received changing multiple color characteristics of the image and thus the new color palette in act 208 can be based on a change to multiple color characteristics of the image.

An image search using search criteria based on the new color palette is initiated (act 210). Initiating the image search refers to beginning or requesting a search, such as by communicating a request to the color based image search module 116 of FIG. 1. The image search can be performed in a variety of different manners using any of a variety of color palette or color based search techniques, and the search criteria can be generated in different manners based at least in part on the manner in which the image search is performed.

In one or more embodiments, the image search is based on hash values representing colors in the image. Hash values are generated by applying any of a variety of hash functions to the values of the colors in the new color palette. The images being search also have associated color palettes (e.g., generated as discussed above), and hash values similarly generated for the color palettes. The search criteria can be the hash values of the colors in the new color palette, and the searching can be identifying images with color palette hash values that are the same as (or within a threshold amount of, or closest to, etc.) the search criteria.

Alternatively, rather than hash values, other values representing the colors in the color palettes can be used. For example, numerical values identifying the colors themselves can be used. By way of another example, other characters, symbols, or combinations thereof can be used.

In other embodiments, the image search is performed in different manners. For example, an image can be generated based on the new color palette. An image can be generated based on the new color palette in different manners, such as by creating an image with pixels having the colors of the new color palette. The quantity of pixels in the created image having a particular color is based on (e.g., is proportional to) the amount of each color in the new color palette. The greater the amount of a color in the new color palette, the larger the number of pixels in the created image having that color. The colors can be distributed to different pixels in the image randomly or using various other rules or criteria. Various additional colors can optionally be distributed throughout the created image as noise. The created image can be the search criteria, and an image matching search can be performed using any of a variety of public and/or proprietary techniques.

Search results generated based on the image search using the search criteria are displayed (act 212), such as to a user. Alternatively, the search results can be presented to a user in other manners, or provided to other components, modules, or devices without being displayed.

Figure 12:
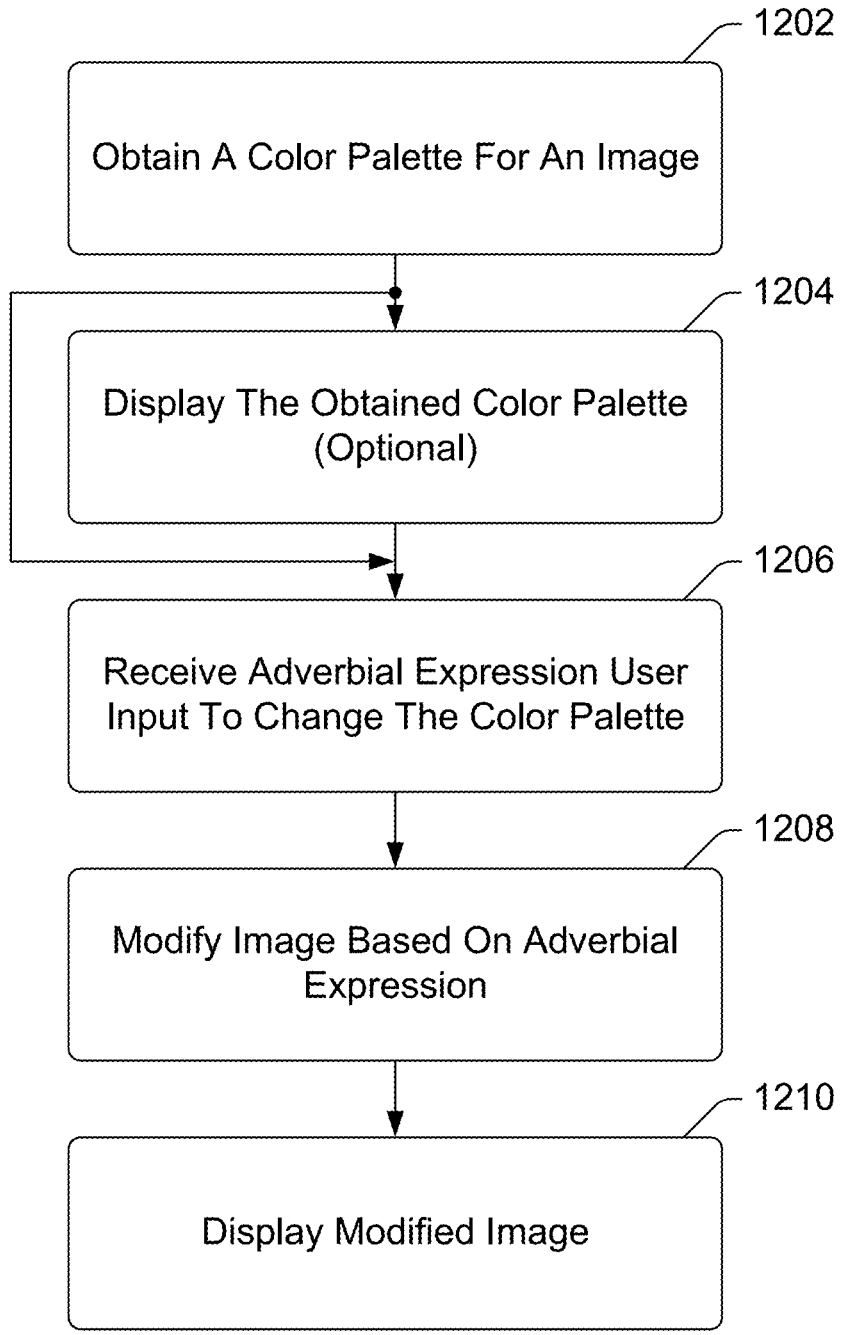
FIG. 12 is a flowchart illustrating another example process for implementing adverbial expression based color image operations in accordance with one or more embodiments.

FIG. 12 is a flowchart illustrating an example process 1200 for implementing adverbial expression based color image operations in accordance with one or more embodiments. In process 1200, the operation is modifying or manipulating color images. Process 1200 is carried out by a system, such as adverbial expression system 102 of FIG. 1, and can be implemented in software, firmware, hardware, or combinations thereof. Process 1200 is shown as a set of acts and is not limited to the order shown for performing the operations of the various acts. Process 1200 is an example process for implementing adverbial expression based color image operations; additional discussions of implementing adverbial expression based color image operations are included herein with reference to different figures.

In process 1200, a color palette for an image is obtained (act 1202). The image can be any of a variety of different images, and the color palette can be obtained in any of a variety of different manners, analogous to the discussion above regarding act 202 of FIG. 2.

The obtained color palette is optionally displayed (act 1204). The color palette is displayed by displaying the colors of the color palette, analogous to the discussion above regarding act 204 of FIG. 2.

A user input in the form of an adverbial expression to change the color palette is received (act 1206). The adverbial expression indicates an increase or decrease in a color characteristic of the image based on the obtained color palette, and can refer to various different color characteristics, analogous to the discussion above regarding act 206 of FIG. 2.

An image is modified based on the adverbial expression (act 1208). In one or more embodiments, the image that is modified is the image for which the color palette was obtained in act 1202. Alternatively, one or more other images can be modified, such as one or more images selected by a user of the adverbial expression system, one or more images identified by another component or module, and so forth.

The adverbial expression can refer to various different color characteristics of the image, analogous to the discussion above regarding act 208 of FIG. 2. The image can be modified in a variety of different manners, and the manner in which the image is modified varies based on the adverbial expression. The image can be modified based on the adverbial expression in different manners, analogous to the discussion above regarding changing the colors in the color palette with reference to act 208 of FIG. 2, although the colors in the image (e.g., colors of individual pixels in the image) are modified in act 1208 rather than the colors in the color palette. For example, the brightness of a subset of colors in the image can be increased or decreased (e.g., all colors in the image, or one or more colors that are the same as (or within a threshold distance of in the color space) user selected colors in the color palette of the image), the depth of colors in the image can be increased or decreased, the colors in the image can be made more or less colorful, the contrast of the colors in the image can be increased or decreased, and so forth.

The modified image is displayed (act 1210), such as to a user. Alternatively, the modified image can be presented to a user in other manners, or provided to other components, modules, or devices without being displayed.

In the discussions herein, reference is made to color palettes based on images and searching for images using search criteria based on the color palettes. It should be noted that the techniques discussed herein can alternatively be applied to portions of an image rather than an entire image. For example, particular objects in images can be identified (e.g., faces, buildings, sunsets, etc.), and color palettes for the objects obtained and changed as discussed above rather than color palettes for the entire image.

Additionally, the techniques discussed herein can be used with various other search techniques. For example, the images to be searched can be images satisfying various other criteria, such as images including particular types of objects (e.g., people, beaches, water, etc.), images having particular characteristics (e.g., no objects in particular portions of the image), and so forth.

Furthermore, although the techniques discussed herein are discussed with reference to particular color characteristics, it should be noted that the techniques can analogously be used with additional color characteristics and/or other image characteristics. For example, the techniques discussed herein can be analogously used for textures of images (e.g., more or less roughness), surface properties (e.g., more or less reflection), and so forth.

In addition, although the techniques discussed herein are discussed with reference to images, the techniques can similarly be applied to video. Video can be treated as a series of images, and values for a series of images can be calculated and used analogously as with images. For example, the dominant color of video can be determined based on the colors included in each of multiple images of the video, and a color palette for the video can be generated as discussed above. User input in the form of an adverbial expression to change the color palette of the video can be received, and color characteristics of the color palette changed in response to the user input as discussed above.

Figure 13:
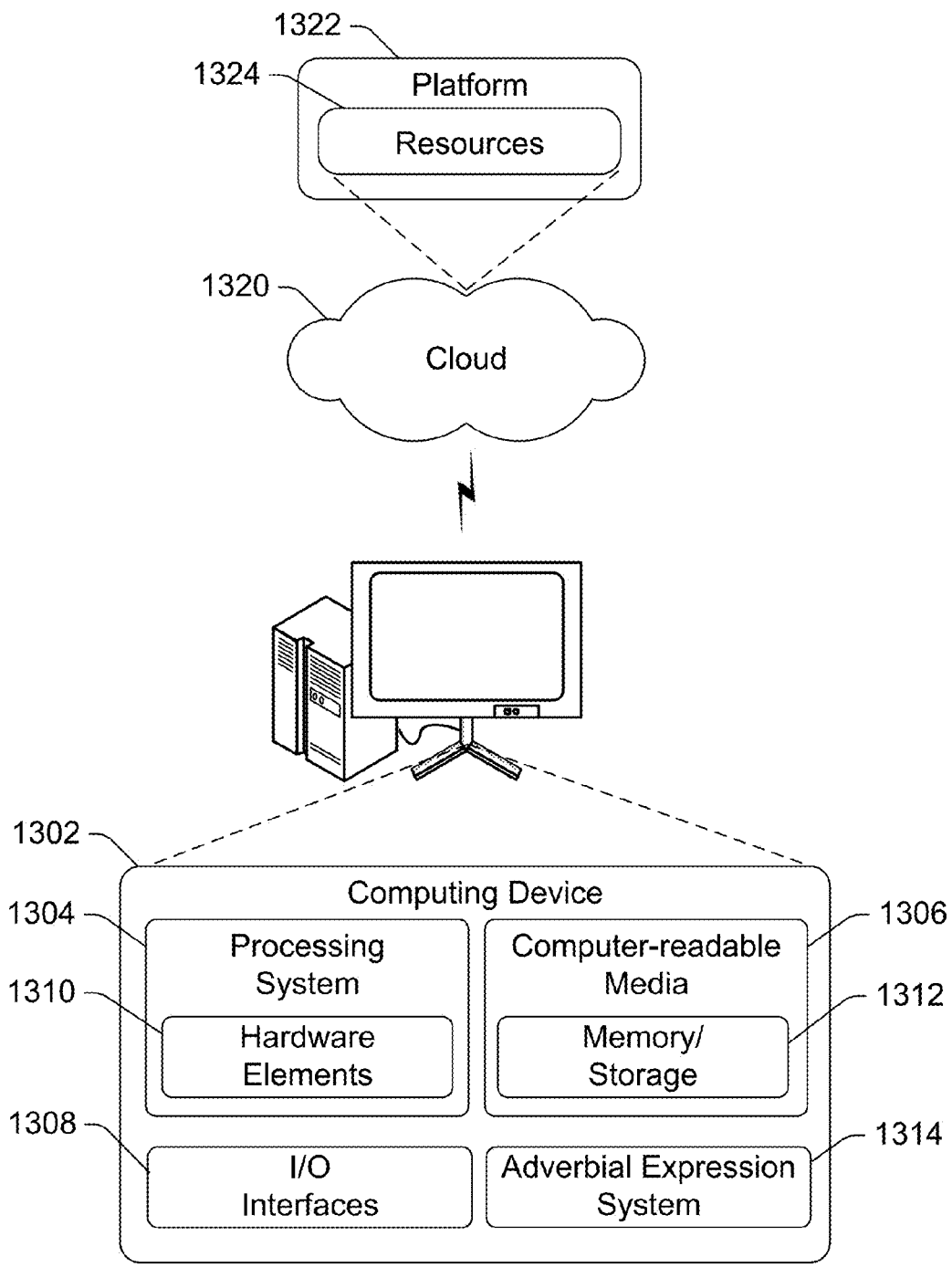
FIG. 13 illustrates an example system that includes an example computing device that is representative of one or more computing systems and/or devices that may implement the various techniques described herein.

FIG. 13 illustrates an example system generally at 1300 that includes an example computing device 1302 that is representative of one or more computing systems and/or devices that may implement the various techniques described herein. This is illustrated through inclusion of the adverbial expression system 1314, which may be configured to perform adverbial expression based color image operations as discussed above. Computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interfaces 1308 that are communicatively coupled, one to another. Although not shown, computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 1304 is representative of functionality to perform one or more operations using hardware. Accordingly, processing system 1304 is illustrated as including hardware elements 1310 that may be configured as processors, functional blocks, and so forth. This may include implementation in hardware as an application specific integrated circuit or other logic device formed using one or more semiconductors. Hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 1306 is illustrated as including memory/storage 1312. Memory/storage 1312 represents memory/storage capacity associated with one or more computer-readable media. Memory/storage component 1312 may include volatile media (such as random access memory (RAM)) and/or nonvolatile media (such as read only memory (ROM), Flash memory, optical disks, magnetic disks, and so forth). Memory/storage component 1312 may include fixed media (e.g., RAM, ROM, a fixed hard drive, and so on) as well as removable media (e.g., Flash memory, a removable hard drive, an optical disc, and so forth). Computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. Computing device 1302 may be configured to implement particular instructions and/or functions corresponding to the software and/or hardware modules. Accordingly, implementation of a module that is executable by computing device 1302 as software may be achieved at least partially in hardware, e.g., through use of computer-readable storage media and/or hardware elements 1310 of processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of computing device 1302 and are not limited to the specific examples of the techniques described herein. This functionality may also be implemented all or in part through use of a distributed system, such as over a "cloud" 1320 via a platform 1322 as described below.

Cloud 1320 includes and/or is representative of a platform 1322 for resources 1324. Platform 1322 abstracts underlying functionality of hardware (e.g., servers) and software resources of cloud 1320. Resources 1324 may include applications and/or data that can be utilized while computer processing is executed on servers that are remote from computing device 1302. Resources 1324 can also include services provided over the Internet and/or through a subscriber network, such as a cellular or Wi-Fi network.

Platform 1322 may abstract resources and functions to connect computing device 1302 with other computing devices. Platform 1322 may also serve to abstract scaling of resources to provide a corresponding level of scale to encountered demand for resources 1324 that are implemented via platform 1322. Accordingly, in an interconnected device embodiment, implementation of functionality described herein may be distributed throughout system 1300. For example, the functionality may be implemented in part on computing device 1302 as well as via platform 1322 that abstracts the functionality of the cloud 1320.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving a user input in the form of an adverbial expression indicating a change to a first color palette of a digital image and the user input indicating that more of a first of multiple different colors in the first color palette is desired;
    transforming the user input into a second color palette, the transforming including generating, in response to the user input indicating that more of the first color is desired, the second color palette by increasing an amount of the first color in the first color palette and decreasing an amount of at least a second color of the multiple different colors in the first color palette, an amount of a color in a color palette representing a quantity of pixels in a digital image; and
    initiating digital image search using search criteria based on the second color palette.

2. A method as recited in claim 1, the adverbial expression comprising a user input indicating an increase or decrease in a color characteristic of the digital image in the absence of displaying a numeric value for the color characteristic.

3. A method as recited in claim 1, further comprising:
    modifying, based on the adverbial expression, the digital image; and
    displaying the modified digital image.

4. A method as recited in claim 1, further comprising:
    obtaining the first color palette of the digital image;
    displaying the first color palette of the digital image; and
    receiving, as the user input, an adverbial expression indicating a change to the displayed first color palette.

5. A method as recited in claim 1, further comprising receiving an additional user input in the form of an additional adverbial expression comprising an indication that a user selected one of multiple colors in the first color palette of the digital image is to be brighter or darker, and the transforming comprising generating the second color palette of the digital image to have the user selected one of the multiple colors brighter or darker than in the first color palette as indicated by the adverbial expression.

6. A method as recited in claim 1, further comprising receiving an additional user input in the form of an additional adverbial expression comprising an indication that all colors in the first color palette of the digital image are to be shallower or deeper, and the transforming comprising generating the second color palette of the digital image to have the colors in the second color palette shallower or deeper than in the first color palette as indicated by the adverbial expression.

7. A method as recited in claim 1, further comprising receiving an additional user input in the form of an additional adverbial expression comprising an indication that all colors in the first color palette of the digital image are to be more or less colorful, and the transforming comprising generating the second color palette of the digital image to have the colors in the second color palette more or less colorful than in the first color palette as indicated by the adverbial expression.

8. A method as recited in claim 1, further comprising receiving an additional user input in the form of an additional adverbial expression comprising an indication to increase or reduce contrast of all colors in the first color palette of the digital image colors in palette, and the transforming comprising generating the second color palette of the digital image to have the contrast of the colors in the second color palette increased or decreased relative to the first color palette as indicated by the adverbial expression.

9. A method as recited in claim 1, the decreasing the amount of at least the second color comprising decreasing the amount of the second color by an amount equal to the amount that the first color is increased.

10. A method as recited in claim 1, the decreasing the amount of at least the second color comprising decreasing the amount of the second color and each of one or more additional colors of the multiple different colors in the second color palette by a total amount that is equal to the amount that the first color is increased.

11. A method as recited in claim 1, further comprising displaying the first color palette, a size of each displayed color of the multiple different colors indicating an amount of the displayed color that is included in the digital image.

12. A method comprising:
    receiving a user input in the form of an adverbial expression indicating a change to a first color palette of a digital image, the user input indicating that less of a first of multiple different colors in the first color palette is desired;
    transforming the adverbial expression into a new color palette by, in response to the adverbial expression indicating that less of the first color is desired, decreasing an amount of the first color in the new color palette and increasing an amount of at least a second of the multiple different colors in the new color palette, an amount of a color in a color palette representing a quantity of pixels in a digital image; and initiating a digital image search using search criteria based on the new color palette.

13. A method as recited in claim 12, further comprising: obtaining the first color palette of the digital image; displaying the first color palette of the digital image; and receiving, as the user input, an adverbial expression indicating a change to the displayed first color palette.

14. A method as recited in claim 12, further comprising receiving an additional user input in the form of an additional adverbial expression comprising an indication that all colors in the digital image are to be more or less colorful, and the transforming comprising making the colors in the new color palette more or less colorful as indicated by the adverbial expression.

15. A device implemented at least in part in hardware, the device comprising:
one or more processors; and
one or more computer-readable storage media having stored thereon multiple instructions that implement an adverbial expression user interface module and an adverbial expression transformation module and that, when executed by the one or more processors, cause the one or more processors to:
display a first color palette of a digital image;
receive a user input in the form of an adverbial expression indicating a change to the first color palette of the digital image, the user input indicating that less of a first of multiple different colors in the first color palette is desired;
transform the user input into a second color palette, the transforming including generating, in response to the user input indicating that less of the first color is desired, the second color palette by decreasing an amount of the first color in the first color palette and increasing an amount of at least a second color of the multiple different colors in the first color palette, the amount of the first color in the first color palette representing a quantity of pixels of the first color in the digital image; and
initiate a digital image search using search criteria based on the second color palette.

16. A device as recited in claim 15, the adverbial expression comprising a user input indicating an increase or decrease in a color characteristic of the digital image in the absence of displaying a numeric value for the color characteristic, and the first color palette of the digital image comprising a set of different colors that are determined to be the dominant colors in the digital image.

17. A device as recited in claim 15, the instructions further causing the one or more processors to receive an additional adverbial expression comprising an indication that a user selected one or more of multiple colors in the first color palette of the digital image is to be brighter or darker, and the transforming comprising generating the second color palette of the digital image to have the user selected one of the multiple colors brighter or darker than in the first color palette as indicated by the adverbial expression.

18. A device as recited in claim 15, the instructions further causing the one or more processors to receive an additional adverbial expression comprising an indication that all colors in the first color palette of the digital image are to be shallower or deeper, and the transforming comprising generating the second color palette of the digital image to have the colors in the second color palette shallower or deeper than in the first color palette as indicated by the adverbial expression.

19. A device as recited in claim 15, the instructions further causing the one or more processors to receive an additional adverbial expression comprising an indication that all colors in the first color palette of the digital image are to be more or less colorful, and the transforming comprising generating the second color palette of the digital image to have the colors in the second color palette more or less colorful than in the first color palette as indicated by the adverbial expression.

20. A device as recited in claim 15, the increasing the amount of at least the second color comprising increasing the amount of the second color and each of one or more additional colors of the multiple different colors in the second color palette by a total amount that is equal to the amount that the first color is decreased.

* * * * *